US011682421B2

(12) United States Patent
Seagle et al.

(10) Patent No.: US 11,682,421 B2
(45) Date of Patent: Jun. 20, 2023

(54) TAPE HEAD DESIGN HAVING A NULL SHIELD FOR SAME GAP VERIFY

(71) Applicant: Western Digital Technologies, Inc., San Jose, CA (US)

(72) Inventors: David J. Seagle, Morgan Hill, CA (US); Alexander Goncharov, Morgan Hill, CA (US); Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/359,046

(22) Filed: Jun. 25, 2021

(65) Prior Publication Data

US 2022/0415344 A1 Dec. 29, 2022

(51) Int. Cl.
*G11B 5/48* (2006.01)
*G11B 5/265* (2006.01)
(Continued)

(52) U.S. Cl.
CPC ........ *G11B 5/3977* (2013.01); *G11B 5/00813* (2013.01); *G11B 5/115* (2013.01);
(Continued)

(58) Field of Classification Search
None
See application file for complete search history.

(56) References Cited

U.S. PATENT DOCUMENTS 3,806,902 A 4/1974 Drees et al.
4,636,902 A 1/1987 Dalziel et al.
(Continued)

FOREIGN PATENT DOCUMENTS

EP 0747888 B1 9/2001
EP 1369865 A2 12/2003
WO 0137276 A1 5/2001

OTHER PUBLICATIONS

Biskeborn, Robert G. et al., "TMR tape drive for a 15 TB cartridge", AIP Publishing, Dec. 2017, https://aip.scitation.org/doi/10.1063/1.5007788, Last accessed Jun. 22, 2021.
(Continued)

*Primary Examiner* — Craig A. Renner
(74) *Attorney, Agent, or Firm* — Patterson + Sheridan, LLP; Steven H. VerSteeg

(57) ABSTRACT

The present disclosure generally relates to a tape drive including a tape head. The tape head comprises at least one same gap verify (SGV) module comprising a plurality of write transducer and read transducer pairs disposed on a substrate. Each pair comprises a null shield disposed between the write transducer and the read transducer. One or more of a position between the write transducer and the read transducer of each pair, a width, a height, a thickness, and a permeability of the null shield is adjusted to create a null region, and the read transducer is disposed in the null region. The SGV module is configured to write data to a tape using the write transducer of each pair and read verify the data written on the tape using the read transducer of each pair such that the write transducer and read transducer of each pair are concurrently operable.

23 Claims, 12 Drawing Sheets

(51) Int. Cl.
*G11B 5/29* (2006.01)
*G11B 5/008* (2006.01)
*G11B 5/23* (2006.01)
*G11B 5/39* (2006.01)
*G11B 5/115* (2006.01)
*G11B 5/11* (2006.01)
*G11B 15/26* (2006.01)

(52) U.S. Cl.
CPC ............. *G11B 5/23* (2013.01); *G11B 5/265* (2013.01); *G11B 5/2652* (2013.01); *G11B 5/29* (2013.01); *G11B 5/3958* (2013.01); *G11B 5/3967* (2013.01); *G11B 5/4893* (2013.01); *G11B 5/11* (2013.01); *G11B 15/26* (2013.01)

(56) References Cited

U.S. PATENT DOCUMENTS

| | | | |
|---|---|---|---|
| 5,940,250 | A | 8/1999 | McNeil et al. |
| 6,038,108 | A | 3/2000 | Dee et al. |
| 6,477,008 | B1* | 11/2002 | Chang et al. ........ G11B 5/3103 360/317 |
| 6,826,140 | B2 | 11/2004 | Brommer et al. |
| 7,149,045 | B1* | 12/2006 | Mallary et al. ........... G11B 5/11 360/55 |
| 7,551,393 | B2 | 6/2009 | Biskeborn et al. |
| 8,089,722 | B2 | 1/2012 | Iben et al. |
| 8,254,058 | B2 | 8/2012 | Biskeborn |
| 8,687,324 | B2 | 4/2014 | Biskeborn et al. |
| 9,007,712 | B1 | 4/2015 | Biskeborn et al. |
| 9,129,631 | B1 | 9/2015 | Biskeborn et al. |
| 9,177,580 | B1 | 11/2015 | Vanderheyden et al. |
| 9,218,838 | B2 | 12/2015 | Biskeborn et al. |
| 9,251,844 | B1 | 2/2016 | Wheelock et al. |
| 9,299,368 | B2 | 3/2016 | Biskeborn et al. |
| 10,014,017 | B1 | 7/2018 | Breuer et al. |
| 10,074,387 | B1 | 9/2018 | Xiao et al. |
| 10,832,712 | B1* | 11/2020 | Seagle et al. ............. G11B 5/11 |
| 10,902,882 | B1 | 1/2021 | Biskeborn |
| 11,087,782 | B1* | 8/2021 | Brown et al. ........... G11B 5/115 |
| 2001/0016271 | A1 | 8/2001 | Aoyama |
| 2003/0214753 | A1 | 11/2003 | Hsu et al. |
| 2005/0018349 | A1 | 1/2005 | Eaton |
| 2005/0036227 | A1 | 2/2005 | Hoerger |
| 2006/0039082 | A1* | 2/2006 | Biskeborn et al. .. G11B 5/4893 360/129 |
| 2006/0092575 | A1* | 5/2006 | Mochizuki et al. ... G11B 5/265 360/319 |
| 2007/0047122 | A1 | 3/2007 | Czarnecki et al. |
| 2007/0133131 | A1* | 6/2007 | Biskeborn ............ G11B 5/3912 360/323 |
| 2007/0146929 | A1* | 6/2007 | Maruyama et al. ...... G11B 5/11 360/125.3 |
| 2007/0223142 | A1* | 9/2007 | Takekuma et al. .. G11B 5/3967 360/131 |
| 2007/0254189 | A1* | 11/2007 | Nakagawa et al. ....... G11B 5/11 428/828.1 |
| 2008/0151436 | A1* | 6/2008 | Sato et al. ........... G11B 5/3123 360/313 |
| 2008/0316632 | A1 | 12/2008 | Czarnecki et al. |
| 2009/0168241 | A1* | 7/2009 | Mochizuki et al. .. G11B 5/3116 360/125.03 |
| 2011/0222187 | A1 | 9/2011 | Biskeborn |
| 2012/0002330 | A1 | 1/2012 | Matsuzawa et al. |
| 2013/0100554 | A1 | 4/2013 | Biskeborn et al. |
| 2014/0198403 | A1* | 7/2014 | Biskeborn et al. .......................... G11B 5/00891 360/48 |
| 2015/0138673 | A1 | 5/2015 | Adrong et al. |
| 2015/0262596 | A1 | 9/2015 | Zuckerman et al. |
| 2020/0219531 | A1 | 7/2020 | Biskeborn et al. |

OTHER PUBLICATIONS

Storage Networking Fundamentals: Storage Devices, Cisco Press, Mar. 4, 2005, pp. 1-4, https://www.ciscopress.com/articles/article.asp?p=372010&seqNum=2, Last accessed Mar. 15, 2021.

Wang, Zhi Gang et al., "Crossfeed Problems in Read-While-Write Tape Heads", IEEE Transactions on Magnetics, vol. 33, No. 4, Jul. 1997, pp. 2531-2537.

International Search Report and the Written Opinion for International Application No. PCT/US2021/035171 dated Aug. 29, 2021, 13 pages.

\* cited by examiner

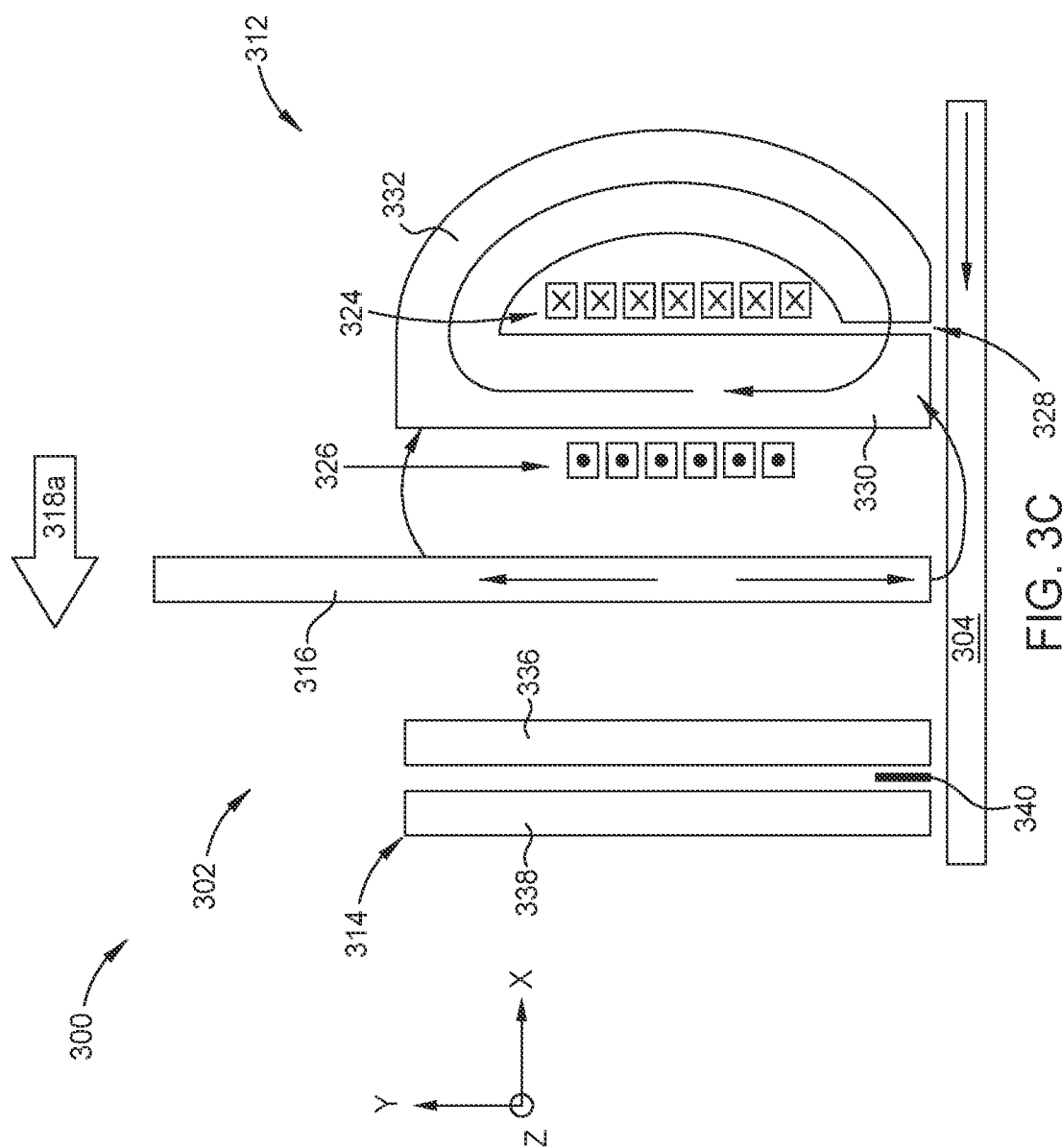

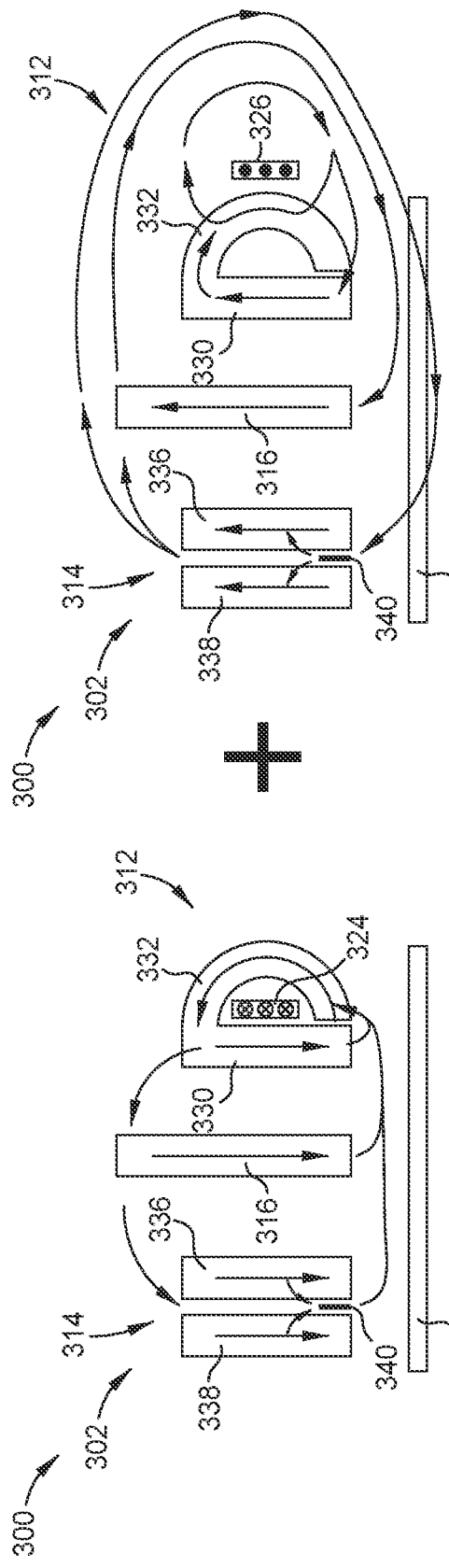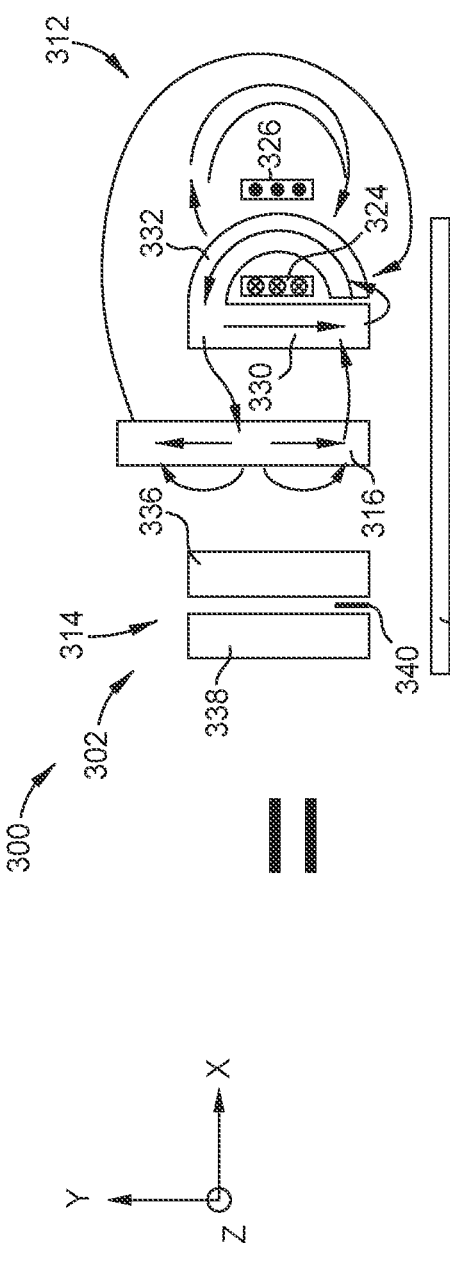

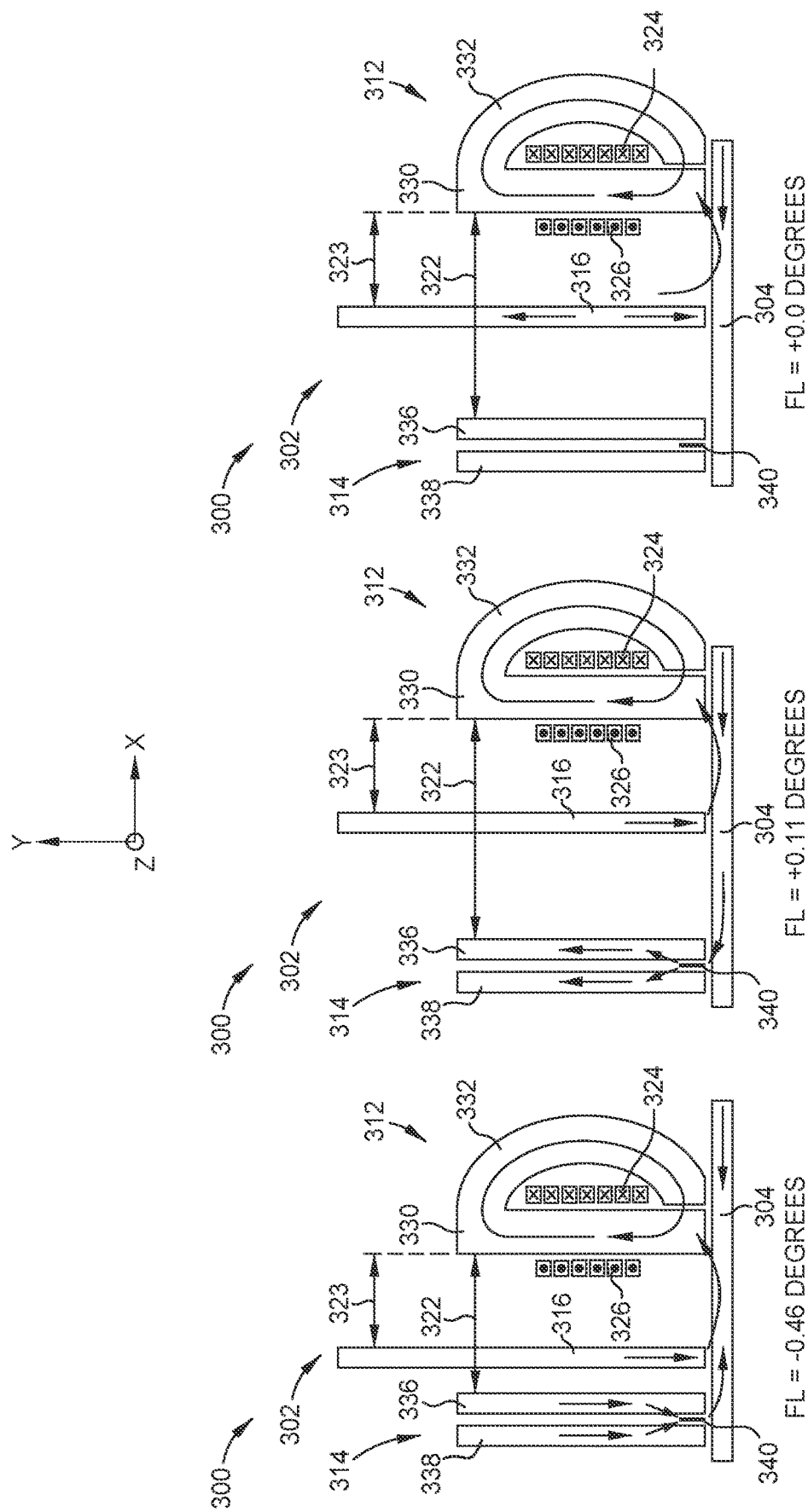

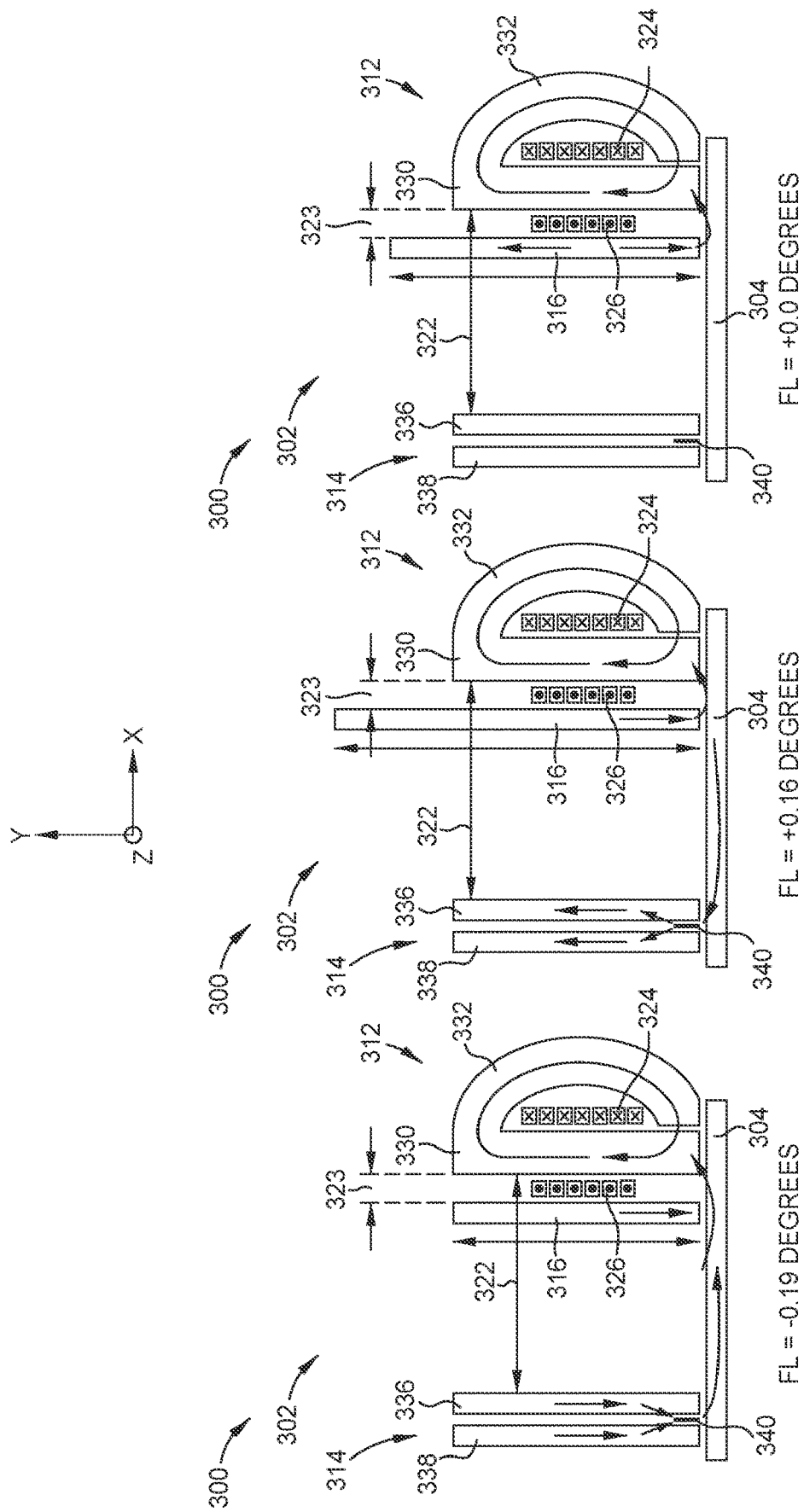

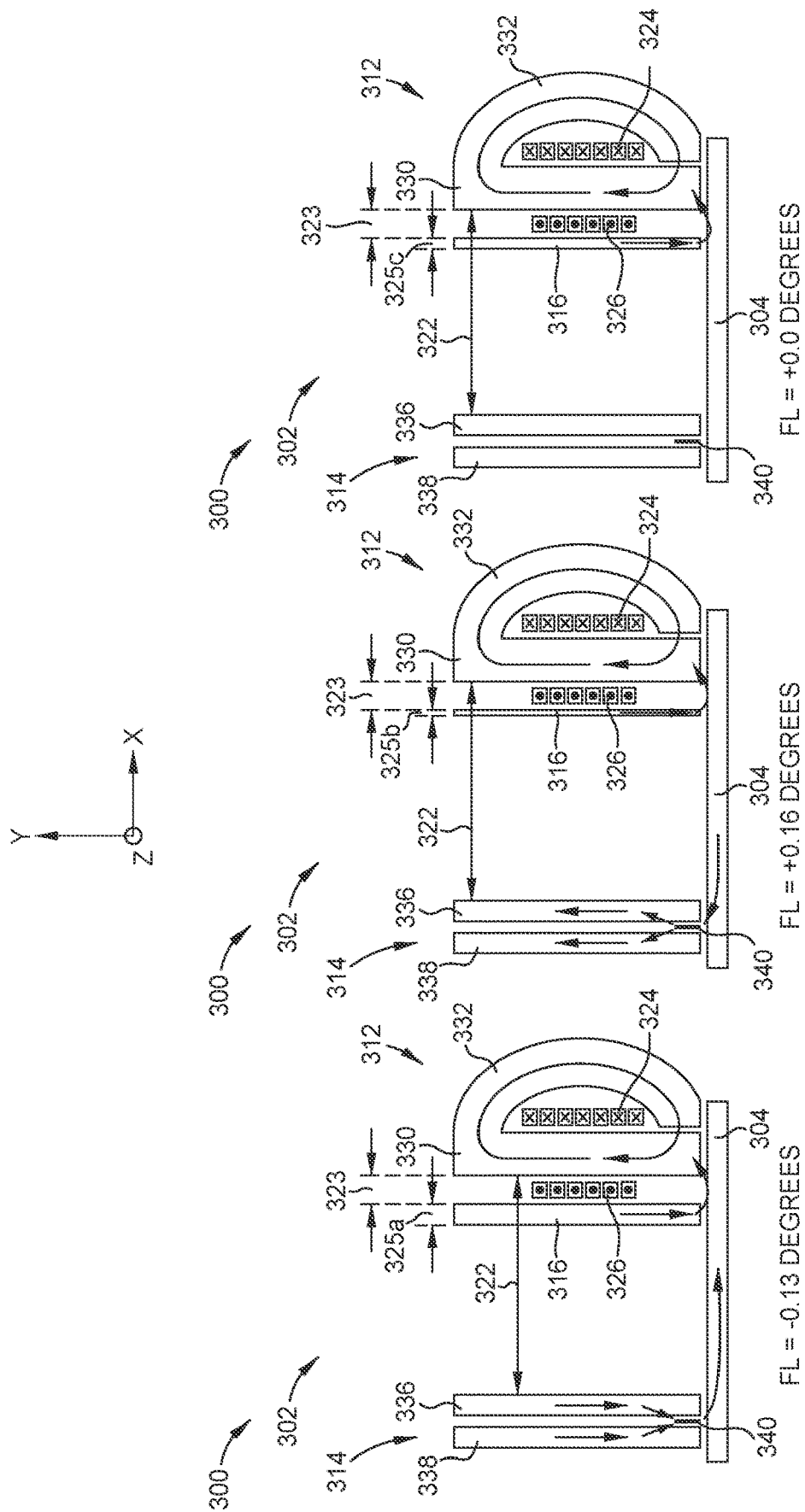

TAPE HEAD DESIGN HAVING A NULL SHIELD FOR SAME GAP VERIFY

BACKGROUND OF THE DISCLOSURE

Field of the Disclosure

Embodiments of the present disclosure generally relate to a tape head and a tape head drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs.

Therefore, there is a need in the art for a tape head configured to write and read verifying data within a single head structure.

SUMMARY OF THE DISCLOSURE

The present disclosure generally relates to a tape drive including a tape head. The tape head comprises at least one same gap verify (SGV) module comprising a plurality of write transducer and read transducer pairs disposed on a substrate. Each pair comprises a null shield disposed between the write transducer and the read transducer. One or more of a position between the write transducer and the read transducer of each pair, a width, a height, a thickness, and a permeability of the null shield is adjusted to create a null region, and the read transducer is disposed in the null region. The SGV module is configured to write data to a tape using the write transducer of each pair and read verify the data written on the tape using the read transducer of each pair such that the write transducer and read transducer of each pair are concurrently operable.

In one embodiment, a SGV module head assembly comprises a substrate, and a plurality of write transducer and read transducer pairs disposed on the substrate, each write transducer and read transducer pair comprising a write transducer, a read transducer, and a null shield disposed between the write transducer and the read transducer. Each write transducer comprises a write pole, a return pole, a core coil, and a return coil. Each read transducer is disposed in the null region such that the SGV module head assembly is controllable to write first data to a tape using the write transducer of each pair and read verify the first data using the read transducer of each pair.

In another embodiment, a tape head comprises a first SGV module head assembly comprising: a plurality of first write transducers disposed in a first row on a first substrate, each first write transducer comprising a write pole, a return pole, a core coil, and a return coil, a plurality of first null shields disposed in a second row adjacent to the first row on the first substrate, wherein one or more of a width, a height, a position, a thickness, and a permeability of each of the plurality of first null shields is varied to create a first null region, and a plurality of first read transducers disposed in a third row adjacent to the second row on the first substrate, each first read transducer comprising a magnetic sensor. Each first read transducer is disposed in the first null region. Each first write transducer of the plurality of first write transducers is paired with an adjacent first read transducer of the plurality of first read transducers and an adjacent first null shield of the plurality of first null shields to form a plurality of first write transducer and first read transducer pairs such that the first SGV module head assembly is controllable to write first data to a tape using the first write transducer of each pair and read verify the first data using the first read transducer of each pair.

In yet another embodiment, a SGV module head assembly comprises a substrate and a plurality of write transducer and read transducer pairs disposed on the substrate, each write transducer and read transducer pair comprising a write transducer, a read transducer, and means for creating a null region. Each write transducer comprises a write pole, a return pole, a core coil, and a return coil. The null region is a location where flux from the core coil cancels out flux from the return coil. Each read transducer is disposed in the null region such that the SGV module head assembly is controllable to write first data to a tape using the write transducer of each pair and read verify the first data using the read transducer of each pair.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3C illustrates a write transducer and a read transducer pair of a SGV module of the tape head of FIGS. 3A-3B, according to one embodiment.

FIGS. 4A-4F illustrate the various magnetic circuits of the writer and the reader pair of a SGV module of the tape head of FIGS. 3A-3C, according to one embodiment.

FIGS. 5A-5C, 6A-6C, and 7A-7C illustrate examples of placing the reader in a null region or null location by varying one or more of the width, height, position, thickness, and permeability of the null shield of a SGV module of the tape head of FIGS. 3A-3C, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive including a tape head. The tape head comprises at least one same gap verify (SGV) module comprising a plurality of write transducer and read transducer pairs disposed on a substrate. Each pair comprises a null shield disposed between the write transducer and the read transducer. One or more of a position between the write transducer and the read transducer of each pair, a width, a height, a thickness, and a permeability of the null shield is adjusted to create a null region, and the read transducer is disposed in the null region. The SGV module is configured to write data to a tape using the write transducer of each pair and read verify the data written on the tape using the read transducer of each pair such that the write transducer and read transducer of each pair are concurrently operable.

Figure 1A:
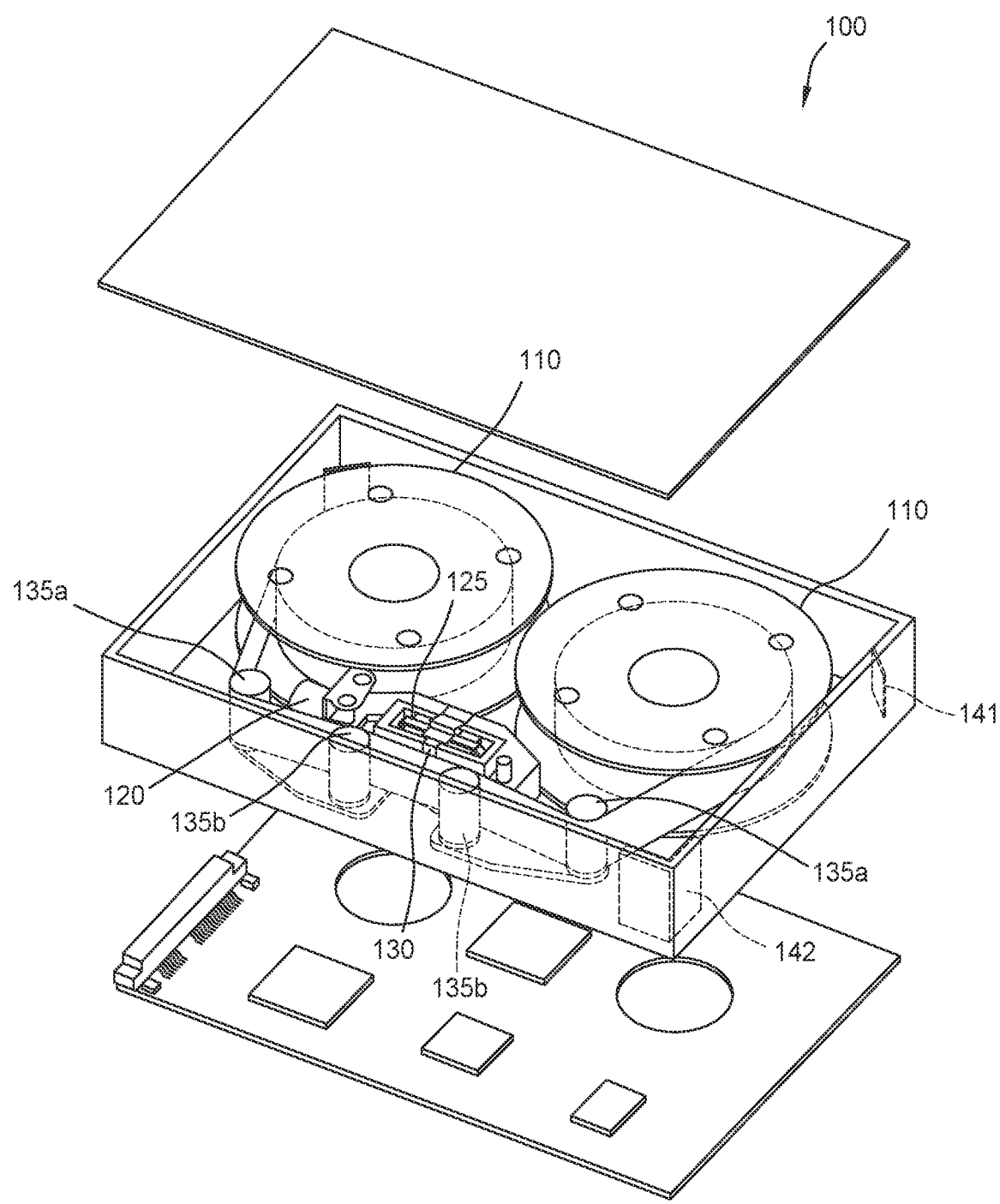
FIGS. 1A-1C illustrate a perspective exploded view, a simplified top down, and side profile view of a tape embedded drive, in accordance with some embodiments.
Figure 1B:
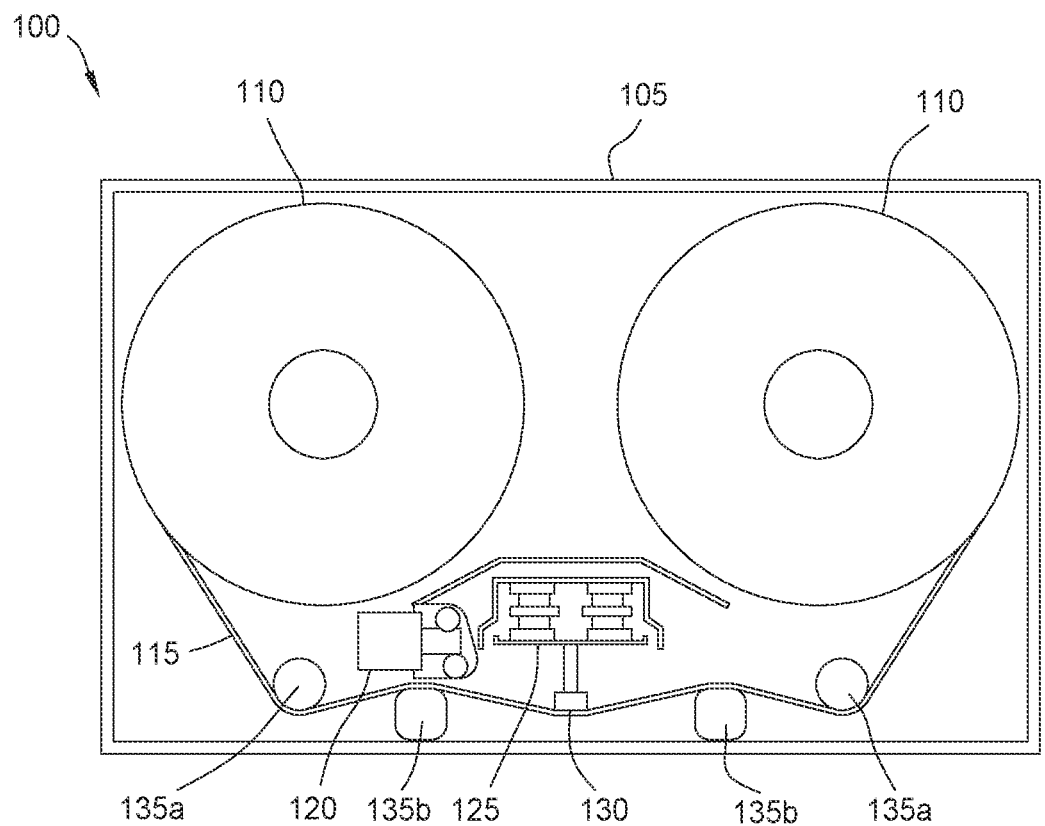
Figure 1C:
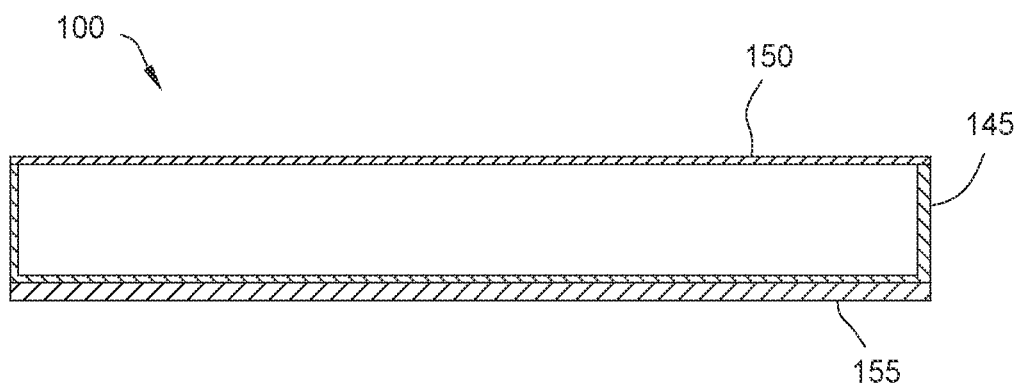

FIGS. 1A-1C illustrate a perspective exploded view, a simplified top down, and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may no longer be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape embedded drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
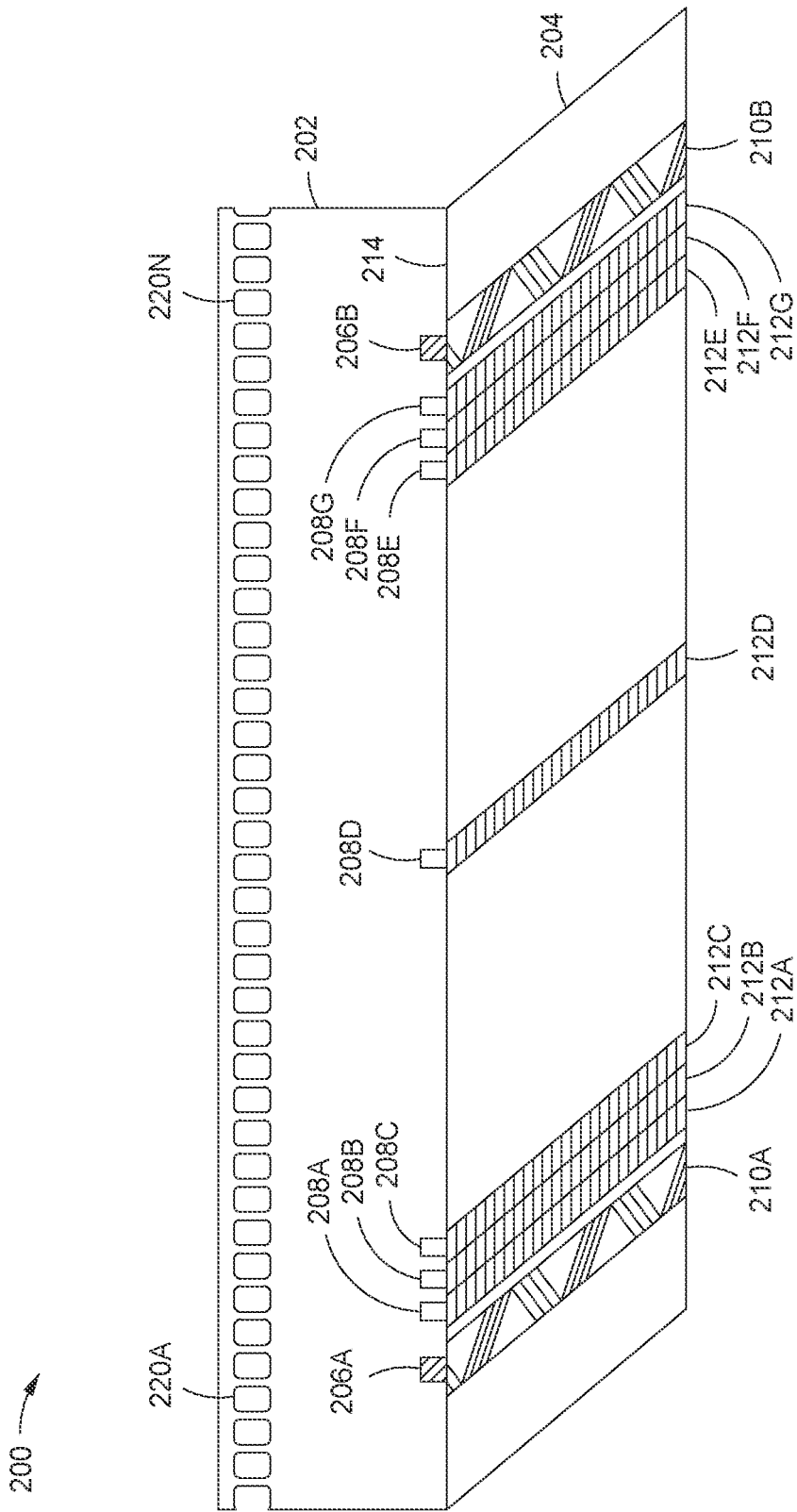
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210b. The combined information allows the servo actuator of the tape drive 200 to align the data heads 208A-208G such that the center data track head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
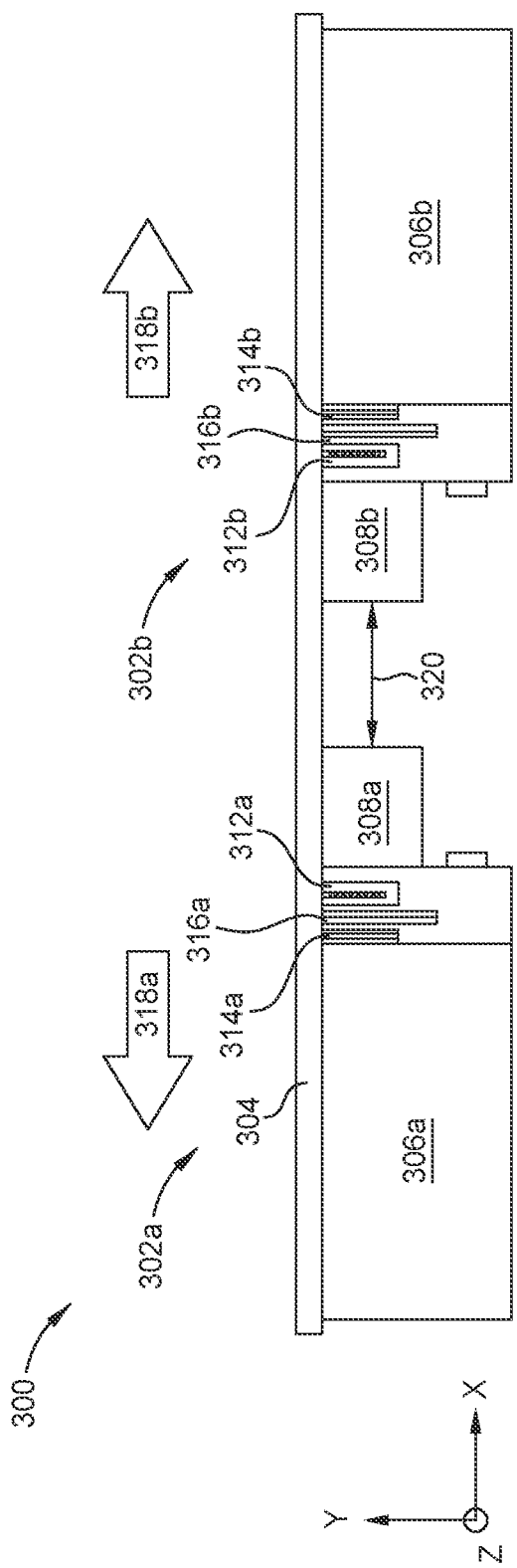
FIG. 3A illustrates a side view of a tape head comprising two same gap verify (SGV) module head assemblies, according to one embodiment.
Figure 3B:
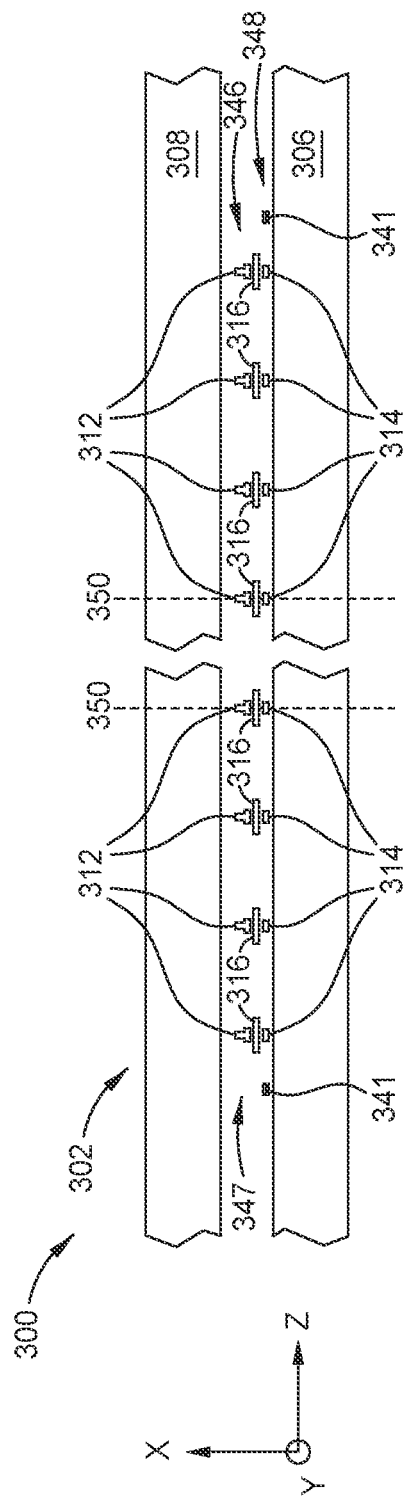
FIG. 3B illustrates a media facing surface (MFS) view of the tape head comprising the two SGV module head assemblies of FIG. 3A, according to one embodiment.

FIGS. 3A-3C illustrate various views of a tape head 300 comprising one or more same gap verify (SGV) module head assemblies 302, according to various embodiments. FIG. 3A illustrates a side view of a tape head 300 comprising two SGV module head assemblies 302a, 302b, according to one embodiment. FIG. 3B illustrates a media facing surface (MFS) view of the tape head 300 comprising the two SGV module head assemblies 302a, 302b of FIG. 3A, according to one embodiment. FIG. 3C illustrates a write transducer 312 and a read transducer 314 pair of a SGV module head assembly 302 of the tape head 300 of FIGS. 3A-3B, according to one embodiment.

The tape head 300 may be utilized within a tape drive comprising a controller, such as the TED 100 of FIG. 1A. The tape head 300 may be the tape head 200 of FIG. 2. The tape head 300 comprises a first SGV module head assembly 302a and a second SGV module head assembly 302b. The first SGV module head assembly 302a may be referred to as a first SGV module 302a, and the second SGV module head assembly 302b may be referred to as a second SGV module 302b. One SGV module head assembly 302a, 302b may be referred to as a SGV module 302 or a SGV module head assembly 302.

As shown in FIG. 3A, the first SGV module 302a comprises a first closure 308a, one or more first write transducers 312a disposed adjacent to the first closure 308a, a first null shield 316a disposed adjacent to the one or more first write transducers 312a, one or more first read transducers 314a disposed adjacent to the first null shield 316a, and a first substrate 306a disposed adjacent to the one or more first read transducers 314a. The one or more first write transducers 312a may be referred to herein as one or more first writers 312a, and the one or more first read transducers 314a may be referred to herein as one or more first readers 314a. Each of the one or more first writers 312a, the one or more first readers 314a, and the one or more first null shields 316a are disposed on the first substrate 306a. It is noted that while only one first writer 312a and one first reader 314a are shown in the first SGV module 302a of the tape head 300 of FIG. 3A, the first SGV module 302a may comprise one or more first writers 312a and one or more first readers 314a, as described in FIG. 3B below.

Similarly, the second SGV module 302b comprises a second closure 308b, one or more second write transducers 312b disposed adjacent to the second closure 308b, a second null shield 316b disposed adjacent to the one or more second write transducers 312b, one or more second read transducers 314b disposed adjacent to the second null shield 316a, and a second substrate 306b disposed adjacent to the one or more second read transducers 314b. The one or more second write transducers 312b may be referred to herein as one or more second writers 312b, and the one or more second read transducers 314b may be referred to herein as one or more second readers 314b. Each of the one or more second writers 312b, the one or more second readers 314b, and the one or more second null shields 316b, are disposed on the second substrate 306b. It is noted that while only one second writer 312b and one second reader 314b are shown in the second SGV module 302b of the tape head 300 of FIG. 3A, the second SGV module 302b may comprise one or more second writers 312b and one or more second readers 314b, as described in FIG. 3B below.

The first and second writers 312a, 312b may be referred to as a writer 312, either collectively or individually. The first and second readers 314a, 314b may be referred to as a reader 314, either collectively or individually. The first and second null shields 316a, 316b may be referred to as a null shield 316, either collectively or individually. The null shield 316 comprises a soft ferromagnetic alloy, such as 80/20 NiFe for example.

As discussed further below in FIGS. 3C-7C, the location of the first null shield 316a between the first writer 312a and the first reader 314a produces a null region for the first reader 314a, where writer flux created by the core and return sources of the write coil of the first writer 312a experienced by the first reader 314a goes to zero, and the location of the second null shield 316b between the second writer 312b and the second reader 314b produces a null region for the second reader 314b, where writer flux created by the core and return sources of the write coil of the second writer 312b experienced by the second reader 314b goes to zero.

The null region is the location where the first and second null shields 316a, 316b effectively block writer flux from the first and second writers 312a, 312b to the first and second readers 314a, 314b, respectively. As such, the first and second readers 314a, 314b are placed in regions where the writer flux at the first and second readers 314a, 314b is zero, establishing a ratio of read signal to coupled writer signal amplitudes (e.g., signal to cross-talk ratio (SXR)) between about 20 dB to about 40 dB. As used herein, the term "null location" or "null region" refers to an area or location where the flux from the writer 312 is zero or canceled out. Additionally, one or more of the width, height, position, thickness, and permeability of the first and second null shields 316a, 316b are adjusted or selected to produce or create the null region, as discussed further below.

In one embodiment, the first SGV module 302a and the second SGV module 302b are arranged in a face-to-face configuration or arrangement such that the first closure 308a of the first SGV module 302a is disposed adjacent to the second closure 308b of the second SGV module 302b. In other words, the first SGV module 302a is a mirror image of the second SGV module 302b, where the second SGV module 302b is a right hand module and the first SGV module 302a is a left hand module. The first SGV module 302a is spaced a distance 320 from the second SGV module 302b of about 500 µm to about 1000 µm. A MFS of each of the first and second SGV modules 302a, 302b is configured to support or face a tape 304 or other magnetic media. The tape 304 is configured to move over the first and second SGV modules 302a, 302b in both the x-direction and the −x-direction. The first SGV module 302a has a first writing and reading direction 318a that is opposite to a second writing and reading direction 318b of the second SGV module 302b.

As the tape 304 or other media moves in the first writing and reading direction 318a (i.e., the −x-direction), the one or more first writers 312a of the first SGV module 302a are able to write data to the tape 304, and the one or more first readers 314a are able to immediately read verify the data newly written to the tape 304. Similarly, as the tape 304 or other media moves in the second writing and reading direction 318b (i.e., the x-direction), the one or more second writers 312b of the second SGV module 302b are able to write data to the tape 304, and the one or more second readers 314b are able to immediately read verify the data newly written to the tape 304. As such, both the first SGV module 302a and the second SGV module 302b are individually able to write data to and read verify data from a tape concurrently.

FIG. 3B illustrates a MFS view of a SGV module head assembly 302 of the tape head 300 of FIG. 3A, according to one embodiment. The SGV module 302 of FIG. 3B may be either the first SGV module 302a or the second SGV module 302b of FIG. 3A. Thus, the SGV module 302 may refer to or be used interchangeably with either the first SGV module 302a or the second SGV module 302b of FIG. 3A.

The SGV module 302 shown in FIG. 3B comprises a plurality of writers 312, a plurality of null shields 316, and a plurality of readers 314 forming a plurality of writer 312 and reader 314 pairs. Each writer 312 and reader 314 pair comprises a null shield 316 disposed between the writer 312 and the reader 314. The plurality of writers 312 are disposed in a first row 346 in the z-direction adjacent to the closure 308, and the plurality of readers 314 are disposed in a second row 348 in the z-direction adjacent to the substrate 306. The plurality of null shields 316 are disposed in a third row 347 between the first row 346 and the second row 348. Each writer 312 is disposed adjacent to and aligned in the x-direction and in the z-direction with a reader 314 and a null shield 316 to form a writer 312 and reader 314 pair. In some embodiments, the writer 312, the reader 314, and the null shield 316 of each pair are both aligned along a center axis 350 in the x-direction.

As used herein, a writer 312 and reader 314 pair refers to a writer 312, a null shield 316, and a reader 314 that are disposed adjacent to one another, and are aligned with one another in at least the x-direction and the z-direction. The writer 312 and the reader 314 of each pair may be either aligned or offset from one another in the y-direction. The SGV module 302 further comprises one or more servo read transducers 341, or servo readers 341. The one or more servo readers 341 are disposed in the second row 348 and are aligned in the z-direction with the plurality of readers 314.

While not shown in FIG. 3B, the plurality of writers 312, the plurality of null shields 316, and the plurality of readers 314 are all spaced apart from one another by a dielectric material, such as alumina, and the electrical connections of each writer 312 and reader 314 are recessed from the MFS in the y-direction. While only eight writer 312 and reader 314 pairs are shown in FIG. 3B, the SGV module 302 may comprise a greater or fewer number of writer 312 and reader 314 pairs. For example, in some embodiments, the SGV module comprises 16 writer 312 and reader 314 pairs. Similarly, while two servo readers 341 are shown in FIG. 3B, the SGV module may comprise a greater or fewer number of servo readers 341, such as two, four, or six servo readers 341. As such, the number of writer 312 and reader 314 pairs and the number of servo readers 341 is not intended to be limiting.

FIG. 3C illustrates a cross-sectional view of a write transducer 312 and a read transducer 314 pair of a SGV module 302 of the tape head 300 of FIGS. 3A-3B, according to one embodiment. The SGV module 302 of FIG. 3C may be either the first SGV module 302a or the second SGV module 302b of FIGS. 3A-3B. As such, the writer 312 may refer to or be used interchangeably with either a first writer 312a of the first SGV module 302a or a second writer 312b of the SGV module 302b, the reader 314 may refer to or be used interchangeably with either a first reader 314a of the first SGV module 302a or a second reader 314b of the SGV module 302b, and the null shield 316 may refer to or be used interchangeably with either a first null shield 316a of the first SGV module 302a or a second null shield 316b of the SGV module 302b.

For clarity purposes, it is noted that the writer 312 is disposed to the right of the reader 314 and the null shield 316, and thus, the writer 312 and reader 314 of FIG. 3C are arranged in the same manner as the first writer 312a, the first reader 314a, and the first null shield 316a of the first SGV module 302a of FIGS. 3A-3B. However, the writer 312 may instead be disposed to the left of the reader 314 and the null shield 316 to be arranged in the same manner as the second writer 312b and the second reader 314b of the second SGV module 302b of FIGS. 3A-3B. As such, the arrangement of the writer 312 and the reader 314 in FIG. 3C is not intended to be limiting.

It is further noted that while only one writer 312 and reader 314 pair are shown in the SGV module 302 of the tape head 300 of FIG. 3C, the tape head 300 comprises one or more writers 312, one or more readers 314, and one or more null shields 316 to form one or more writer 312 and reader 314 pairs, as discussed above in FIG. 3B. In such embodiments, the additional writer 312 and reader 314 pairs are disposed in front of (i.e., the z-direction) and/or behind (i.e., the −z-direction) the writer 312 and reader 314 pair shown in FIG. 3C.

The writer 312 comprises a write pole 330 coupled to a curved return pole 332. A write coil comprising a core source 324 and a return source 326 (herein referred to as a core coil 324 and a return coil 326, respectively) is disposed adjacent to the write pole 330 and the return pole 332. The core coil 324 is disposed between the write pole 330 and the return pole 332, and the return coil 326 is disposed between the write pole 330 and the null shield 316. In some embodiments, the return coil 326 is disposed adjacent to the return pole 332, such that the return pole 332 is disposed between the core coil 324 and the return coil 326. The write pole 330 is spaced from the return pole 332 at the MFS by a write gap 328.

The reader 314 comprises a first shield 338, a second shield 336, and a magnetic sensor 340 disposed between the first and second shields 336, 338. The magnetic sensor 340 may be a tunnel magnetoresistance (TMR) sensor, for example. The magnetic sensor 340 comprises a free layer (not shown), among other layers, and the free layer may rotate due to flux generated from the writer 312. The null shield 316 is disposed between the write pole 330 and the second shield 336 in a desired location to cause writer flux generated from the writer 312 experienced by the reader 314 (e.g., the free layer of the magnetic sensor 340) to go to zero to eliminate crosstalk between the writer 312 and the reader 314. One or more of the width, height, position, thickness, and permeability of the null shield 316 is adjusted or selected to produce the null region, as discussed further below in FIGS. 4A-7C.

When writing data to a tape 304 or other media, the tape 304 moves over the writer 312 in the writing and reading direction 318a (e.g., in the x-direction). Due at least in part to the null shield 316 creating the null region or null location for the reader 314, the writer 312 is able to write to the tape 304 or other media, and the reader 314 is able to read the data to verify the data was written correctly. The null shield 316 reduces magnetic cross-talk between the writer 312 and the reader 314 by creating the null region for the reader 314, enabling the writer 312 and the reader 314 to function concurrently. Thus, the writer 312 is able to write data to a portion of the tape, and the paired reader 314 is able to read verify the newly written portion of the tape immediately. As such, the SGV module(s) 302 is able to write data to and read verify data from a tape concurrently.

The SGV module(s) 302 is able to concurrently write and read data due in part to the null shield 316 creating the null region or null location for the reader 314. The null shield 316 helps cancel out the flux from the write coils 324, 326 of the writer 312, enabling the amplitude of signals in the reader 314 that arise from coupling of magnetic flux from the paired writer 312 to be reduced or substantially less than the readback signal of the reader 314 itself. By utilizing the null shield to create a null region for the reader 314 (e.g., by canceling out the flux from the writer 312 experienced by the reader 314), and by adjusting magnetic design parameters, such as magnetic shield dimensions, write transducer coil design, and optionally deploying additional shielding between the read and write transducers 314, 312, a ratio of read signal to coupled writer signal amplitudes (e.g., signal to cross-talk ratio (SXR)) greater than about 20 dB or about 40 dB may be achieved.

Moreover, referring back to FIG. 3A, the tape head 300 is controllable such that the first SGV module 302a is able to write data to the tape 304 and the second SGV module 302b is able to read verify the data, or vice versa. However, both the first and second SGV modules 302a, 302b are able to independently write data to the tape 304 and to read verify the data without utilizing the other SGV module 302a, 302b. In other words, the first writer 312a of the first SGV module 302a is able to write data to the tape 304 and the first reader 314a is able to read verify the newly written data, and the second writer 312b of the second SGV module 302b is able to write data to the tape 304 and the second reader 314b is able to read verify the newly written data. Thus, the first writer 312a and the first reader 314a of the first SGV module 302a may be used concurrently to write data to and read data from the tape 304, and the second writer 312b and the second reader 314b of the second SGV module 302b may be used concurrently to write data to and read data from the tape 304.

As used herein, the SGV module(s) 302 being able to "concurrently" write and read data refers to the fact that both the writer 312 and the reader 314 are concurrently turned "on" or able to operate simultaneously with respect to various data written to a tape 304. However, it is to be noted that the writer 312 and the reader 314 are not "concurrently" operating on the same data at the same time. Rather, the writer 312 first writes data, and as the tape moves over the reader 314, the reader 314 is then able to read verify the newly written data as the writer 312 concurrently writes different data to a different portion of the tape. Furthermore, it is to be noted that a controller (not shown) is configured to operate the SGV module(s) 302, and as such, the controller is configured to independently operate both the writer 312 and the reader 314. Thus, while the writer 312 is described as writing data and the reader 314 is described as reading the data, the controller enables the writer 312 to write and enables the reader 314 to read.

FIGS. 4A-4F illustrate the various magnetic circuits of the writer 312 and the reader 314 pair of a SGV module 302 of the tape head 300 of FIGS. 3A-3C, according to one embodiment. As such, the reference numerals of FIGS. 4A-4F are consistent with FIG. 3C where applicable. Furthermore, it is noted that while only one writer 312 and reader 314 pair is shown in the SGV module 302 of the tape head 300 of FIGS. 4A-4F, the tape head 300 comprises one or more writers 312, one or more readers 314, and one or more null shields 316 to form one or more writer 312 and reader 314 pairs, as discussed above.

Figure 4A:
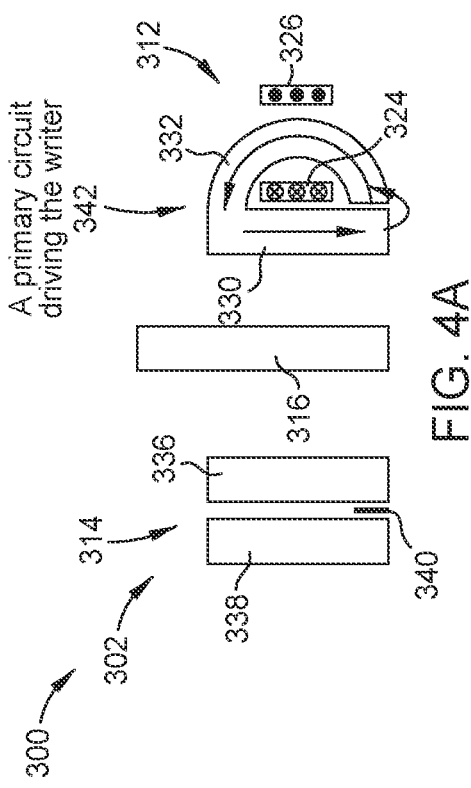
Figure 4B:
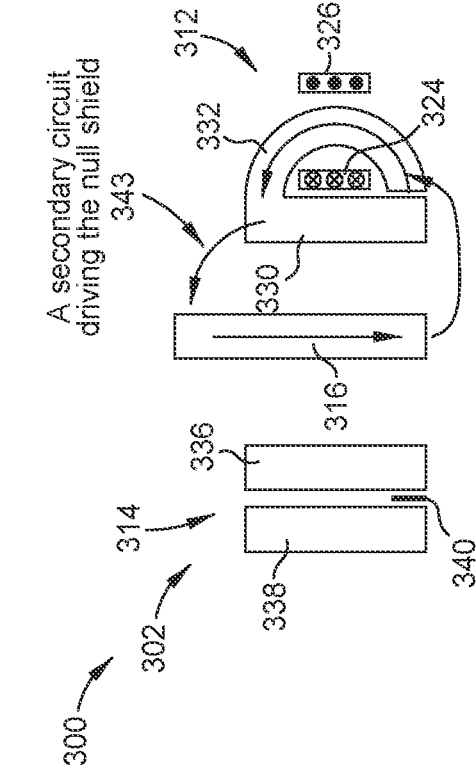
Figure 4C:
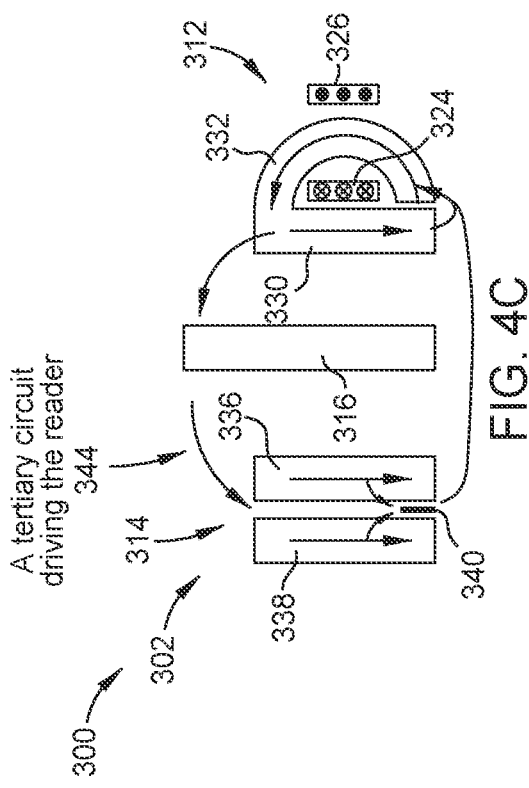

FIG. 4A illustrates a primary circuit 342 to power or drive the writer 312. FIG. 4B illustrates a secondary circuit 343 to drive the null shield 316. FIG. 4C illustrates a tertiary circuit 344 to power or drive the reader 314. FIG. 4D illustrates the core coil 324 driving all three circuits 342, 343, 344 of FIGS. 4A-4C counter-clockwise while FIG. 4E illustrates the return coil 326 driving all three circuits 342, 343, 344 of FIGS. 4A-4C clockwise.

As shown by FIGS. 4D and 4E, the flux direction (shown by the arrows) at the magnetic sensor 340 of the reader 314 changes depending on whether the writer 312 is being driven by the core coils 324 or the return coils 326. For example, the flux direction (shown by the arrows) in FIG. 4D at the magnetic sensor 340 (or the free layer of the magnetic sensor 340) is downwards towards the media 304 (i.e., in the −y-direction) while the flux direction in FIG. 4E at the magnetic sensor 340 (or the free layer of the magnetic sensor 340) is upwards away from the media 304 (i.e., in the y-direction). FIG. 4F illustrates the magnetic circuit comprising the primary circuit 342, the secondary circuit 343, and the tertiary circuit 344 combining to "null" or cancel the flux at the location of the reader 314, according to one embodiment. Thus, by judiciously selecting the location of the null shield 316, the flux from the writer 312 and the magnetic circuit can be nulled at the reader 314 location.

FIGS. 5A-7C illustrate examples of placing the reader 314 in the null region or null location by varying one or more of the width, height, position, thickness, and permeability of the null shield 316 of a SGV module 302 of the tape head 300 of FIGS. 3A-3C, according to various embodiments. As such, the reference numerals of FIGS. 5A-7C are consistent with FIG. 3C where applicable. FIGS. 5A-7C are meant only to be examples of adjusting one or more of the width, height, position, thickness, and permeability of the null shield 316 such that the reader 314 is disposed in the null location. FIGS. 5A-7C are not intended to be limiting in any way.

Furthermore, it is noted that while only one writer 312 and reader 314 pair is shown in the SGV module 302 of the tape head 300 of FIGS. 5A-7C, each tape head 300 comprises one or more writers 312, one or more readers 314, and one or more null shields 316 to form one or more writer 312 and reader 314 pairs, as discussed above.

FIGS. 5A-5C illustrate examples of varying the location of the null shield 316 between the writer 312 and the reader 314, as well as the separation between the writer 312 and the reader 314, to determine the null location, according to one embodiment. In FIGS. 5A-5C, the null shield 316 has a height in the y-direction of about 30 μm, which is greater than a height of both the second shield 336 of the reader 314 and the write pole 330 of the writer 312. Furthermore, the null shield 316 of FIGS. 5A-5C has a consistent height in the y-direction, a consistent width in the z-direction, a consistent thickness in the x-direction, and a consistent permeability; however, the position or placement of the null shield 316 between the second shield 336 and the write pole 330 varies. Thus, FIGS. 5A-5C are intended to show how adjusting the position or placement of the null shield 316 between the second shield 336 and the write pole 330 can create a null region at the location of the reader 314.

In FIG. 5A, the null shield 316 is spaced a first distance 323 in the x-direction of about 5 μm from the writer 312, and the writer 312 is spaced a second distance 322 in the x-direction of about 7.5 μm from the reader 314. In other words, the null shield 316 is spaced closer to the reader 314 than to the writer 312. As such, the magnetic sensor 340 of the reader 314 experiences flux (shown by the downward arrows) from the core coil 324 of the writer 312, causing the magnetic sensor 340 to magnetically rotate downwards towards the media 304 (i.e., in the −y-direction). More specifically, in the example shown in FIG. 5A, the free layer (FL) of the magnetic sensor 340 rotates downwards at an angle of about −0.46 degrees.

In FIG. 5B, the null shield 316 is spaced a first distance 323 in the x-direction of about 5 μm from the writer 312, and the writer 312 is spaced a second distance 322 in the x-direction of about 12 μm from the reader 314. In other words, the null shield 316 is spaced slightly closer to the writer 312 than to the reader 314. As such, the magnetic sensor 340 of the reader 314 experiences flux (shown by the upwards arrows) from the return coil 326 of the writer 312, causing the magnetic sensor 340 to magnetically rotate upwards away from the media 304 (i.e., in the y-direction).

More specifically, in the example shown in FIG. 5B, the free layer of the magnetic sensor 340 rotates upwards at an angle of about +0.11 degrees.

In FIG. 5C, the null shield 316 is spaced a first distance 323 in the x-direction of about 5 µm from the writer 312, and the writer 312 is spaced a second distance 322 in the x-direction of about 11.1 µm from the reader 314. The magnetic sensor 340 of the reader 314 experiences no flux, as the flux from the core coil 324 and the flux from the return coil 326 cancel one another out at the location of the reader 314. More specifically, in the example shown in FIG. 5C, the free layer of the magnetic sensor 340 rotates at an angle of about +0.0 degrees. By canceling out the flux from the core coil 324 and the return coil 326, a ratio of read signal to coupled writer signal amplitudes (e.g., a SXR) between about 20 dB to about 40 dB is established, allowing the reader 314 and the writer 312 to operate concurrently.

FIGS. 6A-6C illustrate examples of varying the size of the null shield 316 to determine the null location, according to one embodiment. In FIGS. 6A-6C, the null shield 316 is spaced a first distance 323 in the x-direction of about 1 µm, and the writer 312 is spaced a second distance 322 in the x-direction of about 12 µm from the reader 314. Furthermore, the null shield 316 of FIGS. 6A-6C has a consistent position or placement between the second shield 336 and the write pole 330, as well as a consistent thickness in the x-direction and a consistent permeability; however, the height in the y-direction and/or width in the z-direction of the null shield 316 varies. Thus, FIGS. 6A-6C are intended to show how varying the size of the null shield 316 can create a null region at the location of the reader 314.

In FIG. 6A, the null shield 316 has a height in the y-direction of about 20 µm, resulting in the magnetic sensor 340 of the reader 314 experiencing flux (shown by the downward arrows) from the core coil 324 of the writer 312. The flux from the core coil 324 causes the magnetic sensor 340 to magnetically rotate downwards towards the media 304 (i.e., in the −y-direction). More specifically, in the example shown in FIG. 6A, the free layer of the magnetic sensor 340 rotates downwards at an angle of about −0.19 degrees.

In FIG. 6B, the null shield 316 has a height in the y-direction of about 30 µm, resulting in the magnetic sensor 340 of the reader 314 experiencing flux (shown by the downward arrows) from the return coil 326 of the writer 312. The flux from the core coil 324 causes the magnetic sensor 340 to magnetically rotate upwards towards the media 304 (i.e., in the −y-direction). More specifically, in the example shown in FIG. 6B, the free layer of the magnetic sensor 340 rotates upwards at an angle of about +0.16 degrees.

In FIG. 6C, the null shield 316 has a height in the y-direction of about 25.4 µm, resulting in the magnetic sensor 340 of the reader 314 experiencing no flux, as the flux from the core coil 324 and the flux from the return coil 326 cancel one another out at the location of the reader 314. More specifically, in the example shown in FIG. 6C, the free layer of the magnetic sensor 340 rotates at an angle of about +0.0 degrees. By canceling out the flux from the core coil 324 and the return coil 326, a ratio of read signal to coupled writer signal amplitudes (e.g., a SXR) between about 20 dB to about 40 dB is established, allowing the reader 314 and the writer 312 to operate concurrently.

FIGS. 7A-7C illustrate examples of varying the width and permeance of the null shield 316 to determine the null location, according to one embodiment. In FIGS. 7A-7C, the null shield 316 is spaced a first distance 323 in the x-direction of about 1 µm, and the writer 312 is spaced a second distance 322 in the x-direction of about 12 µm from the reader 314. The height of the null shield 316 in the y-direction is about 20 µm. Furthermore, the null shield 316 of FIGS. 7A-7C has a consistent position or placement between the second shield 336 and the write pole 330, as well as a consistent height in the y-direction and a consistent width in the z-direction; however, the permeance and/or thickness in the x-direction of the null shield 316 varies. Thus, FIGS. 7A-7C are intended to show how varying the permeance and/or thickness in the x-direction of the null shield 316 can create a null region at the location of the reader 314.

In FIG. 7A, the null shield 316 has a thickness 325a in the x-direction of about 1 µm and a permeability of about 1000. As such, the magnetic sensor 340 of the reader 314 experiences flux (shown by the downward arrows) from the core coil 324 of the writer 312, causing the magnetic sensor 340 to magnetically rotate downwards towards the media 304 (i.e., in the −y-direction). More specifically, in the example shown in FIG. 7A, the free layer of the magnetic sensor 340 rotates downwards at an angle of about −0.13 degrees.

In FIG. 7B, the null shield 316 has a thickness 325b in the x-direction of about 0.2 µm and a permeability of about 1000. As such, the magnetic sensor 340 of the reader 314 experiences flux (shown by the downward arrows) from the return coil 326 of the writer 312, causing the magnetic sensor 340 to magnetically rotate upwards towards the media 304 (i.e., in the y-direction). More specifically, in the example shown in FIG. 7B, the free layer of the magnetic sensor 340 rotates upwards at an angle of about +0.16 degrees.

In FIG. 7C, the null shield 316 has a thickness 325c in the x-direction of about 0.64 µm and a permeability of about 1000. The magnetic sensor 340 of the reader 314 experiences no flux, as the flux from the core coil 324 and the flux from the return coil 326 cancel one another out at the location of the reader 314. More specifically, in the example shown in FIG. 7C, the free layer of the magnetic sensor 340 rotates at an angle of about +0.0 degrees. By canceling out the flux from the core coil 324 and the return coil 326, a ratio of read signal to coupled writer signal amplitudes (e.g., a SXR) between about 20 dB to about 40 dB is established, allowing the reader 314 and the writer 312 to operate concurrently.

Thus, FIGS. 5A-7C illustrate how adjusting one or more of the width in the z-direction, the height in the y-direction, the position in the y-direction between the second shield 336 and the write pole 330, the thickness in the x-direction, and the permeability of the null shield 316, the flux from the core coil 324 and the return coil 326 can be canceled out a null location where the reader 314 is disposed. Due at least in part to the null shield 316 creating the null region or null location for the reader 314, the writer 312 is able to write to the tape 304 or other media, and the reader 314 is able to read the data to verify the data was written correctly. The null shield 316 reduces magnetic cross-talk between the writer 312 and the reader 314, enabling the writer 312 and the reader 314 to function concurrently. Thus, the writer 312 is able to write data to a portion of the tape, and the paired reader 314 is able to read verify the newly written portion of the tape immediately.

FIGS. 8A-8E illustrate various stages of forming a SGV module head assembly 302 of the tape head 300 of FIGS. 3A-3C, according to various embodiments. The SGV module 302 of FIGS. 8A-8E may be the first SGV module 302a or the second SGV module 302b of FIGS. 3A-3B, or the SGV module 302 FIG. 3C. It is noted that FIGS. 8A-8E have been simplified or exaggerated for clarity, and aspects of the formation process may not be shown in entirety.

Figure 8A:
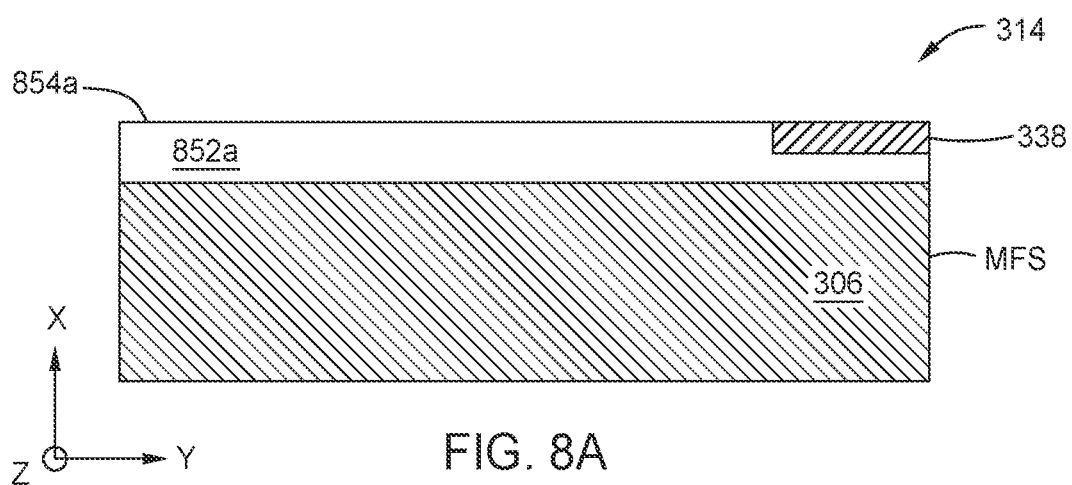
FIGS. 8A-8E illustrate various stages of forming a SGV module head assembly of the tape head of FIGS. 3A-3C, according to various embodiments.

As shown in FIG. 8A, a first dielectric layer 852a, such as alumina, is deposited on the substrate 306, and the first shield 338 of the reader 314 is disposed over a portion of the first dielectric layer 852a at the MFS. A top surface 854a of the first dielectric layer 852a and the first shield 338 is then polished or planarized to be substantially flat (i.e., a first substantially flat surface 854a) using chemical mechanical polishing (CMP).

Figure 8B:
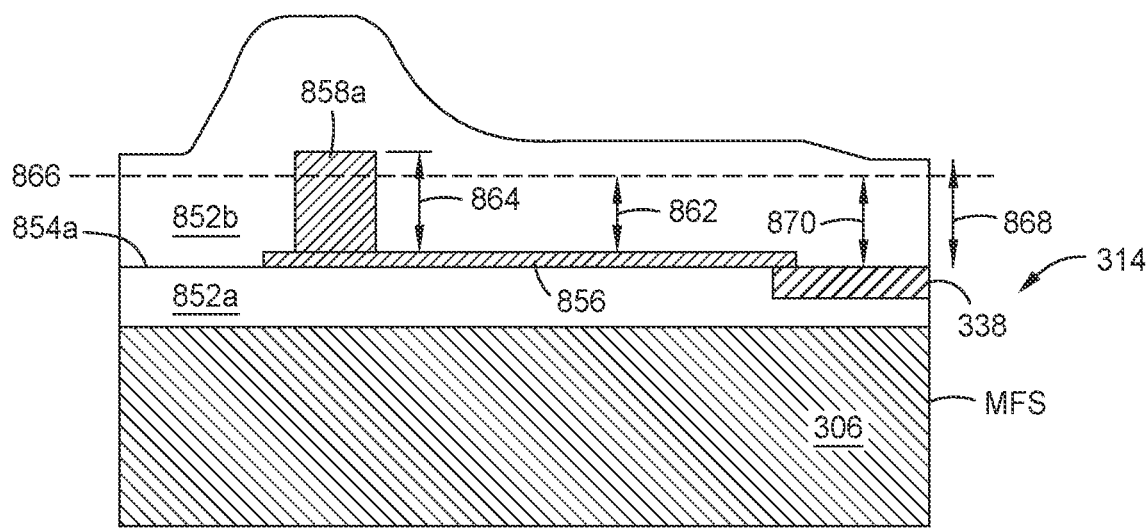

In FIG. 8B, a lead 856 is disposed over the top surface 854a of the first dielectric layer 852a and a portion of the first shield 338. The lead 856 is recessed from the MFS and extends in the −y-direction away from the MFS. A first electrical stud 858a is deposited over a portion of the lead 856 recessed from both the MFS and the first shield 338. The lead 856 is coupled to the first electrical stud 858a and the first shield 338 to form an electrical connection for the reader 314. The first electrical stud 858a is plated to have an initial height 864 in the x-direction greater than a target height 862 (shown by the dotted line 866) of the first electrical stud 858a. A second dielectric layer 852b, such as alumina, is deposited over the first shield 338, the lead 856, and the first electrical stud 858a. The second dielectric layer 852b has an initial thickness 868 in the x-direction greater than a target thickness 870 (shown by the dotted line 866).

Figure 8C:
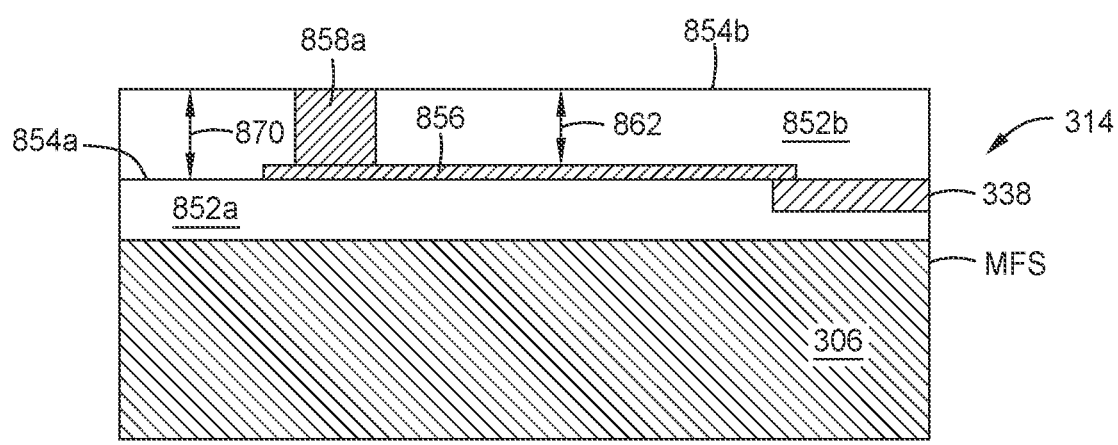

In FIG. 8C, the first electrical stud 858a and the second dielectric layer 852b are then polished using CMP to the target height 862 and the target thickness 870, respectively, such that the second dielectric layer 852b and the first electrical stud 858a form a second substantially flat surface 854b. The process is then repeated one or more times as the magnetic sensor 340 and the second shield 336 are formed (shown in FIG. 8D).

Figure 8D:
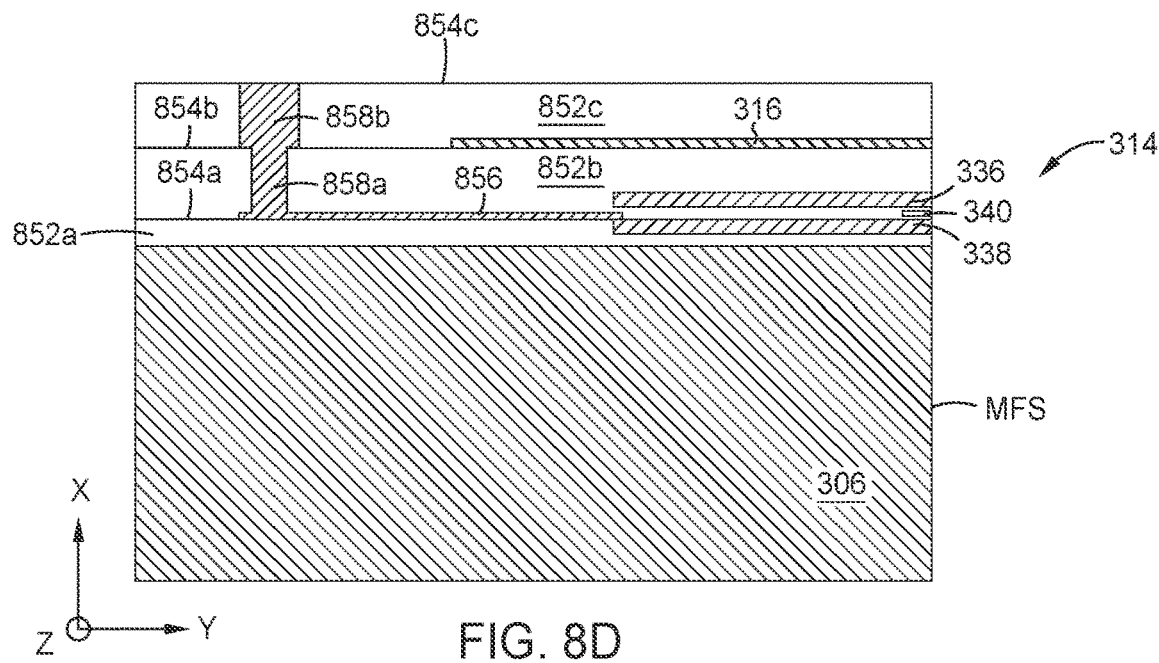

In FIG. 8D, the null shield 316 is disposed on the second substantially flat surface 854b, a third dielectric layer 852c, such as alumina, is deposited over the second dielectric layer 852b and the null shield 316, and a second electrical stud 858b is disposed over and connected to the first electrical stud 858a. The various parameters of the null shield 316, such as the width, height, position, thickness, and permeability discussed above, are selected prior to depositing the null shield 316. The third dielectric layer 852c and the second electrical stud 858b are then polished using CMP to form a third substantially flat surface 854c.

Figure 8E:
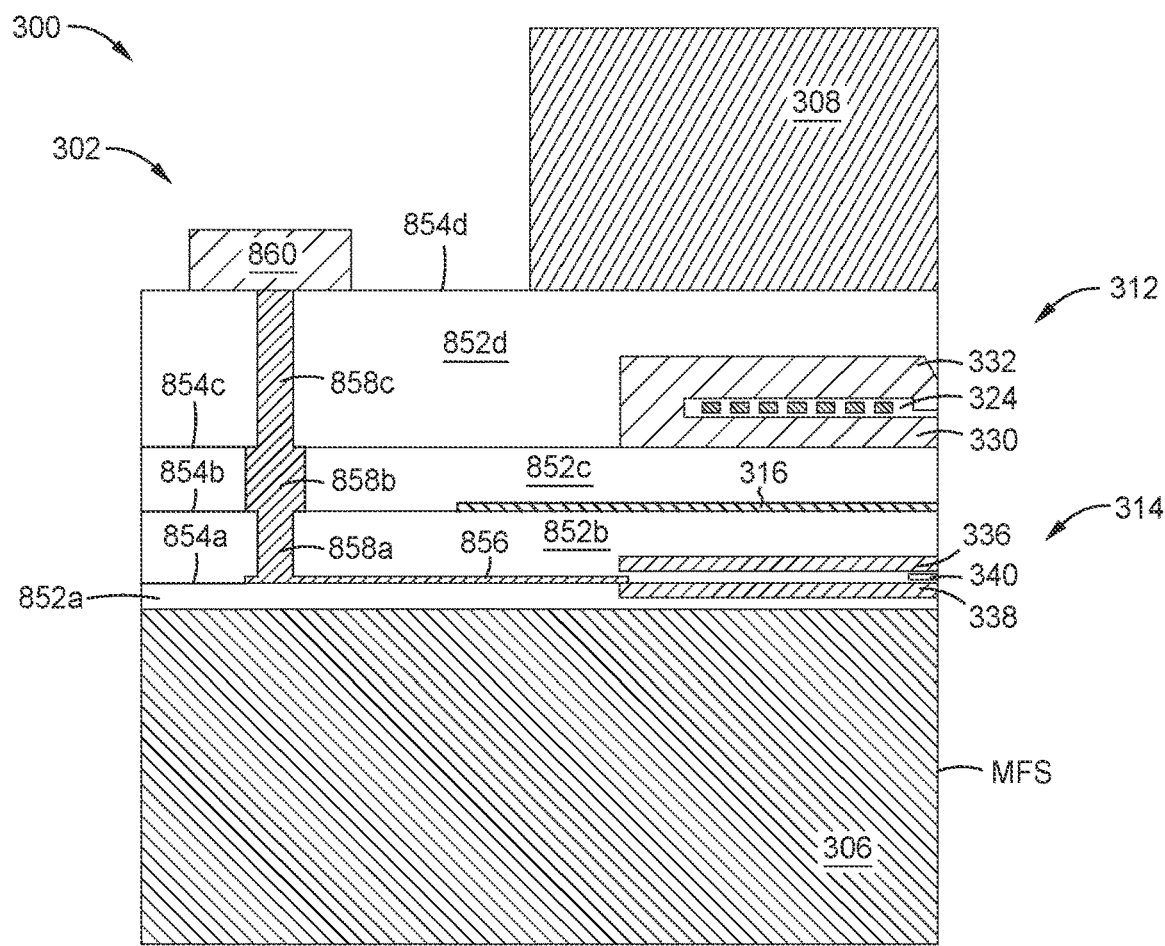

The process is then repeated one or more times as the various components of the writer 312 are formed (as shown in FIG. 8E). The writer 312 is disposed over the third dielectric layer 852c at the MFS, and a fourth dielectric layer 852d, such as alumina, is deposited adjacent to the writer 312 on the third dielectric layer 852c. A third electrical stud 858c is disposed over and connected to the second electrical stud 858b.

While not shown, each of the first, second, third, and fourth dielectric layer 852a-852d may individually comprise one or more dielectric layers, where each of the one or more dielectric layers (or portions of the first, second, third, and fourth dielectric layer 852a-852d) may be individually deposited and polished using CMP as the various components of the writer 312 and/or reader 314 are formed or deposited. For example, the write pole 330 and a first portion of the fourth dielectric layer 852d may be deposited and polished using CMP, the core coil 324, the return coil 326, and a second portion of the fourth dielectric layer 852d may be deposited and polished using CMP, and the return pole 332 and a third portion of the fourth dielectric layer 852d may be deposited and polished using CMP.

The fourth dielectric layer 852d and the third electrical stud 858c are then polished using CMP to form a fourth substantially flat surface 854d. An electrical contact 860 is deposited in contact with the third electrical stud 858c on the fourth substantially flat surface 854d of the fourth dielectric layer 852d and the third electrical stud 858c recessed from the MFS. The first, second, and third electrical studs 858a-858c couple the electrical contact 860 to the reader 314 through the lead 856. The closure 808 is disposed adjacent to the electrical contact 860 on the fourth substantially flat surface 854d at the MFS.

Therefore, a SGV module head assembly of a tape head comprising a plurality of writer and reader pairs, each pair comprising a null shield therebetween to allow the reader to be placed in a null region unaffected by flux from the writer, enables the SGV module to write data to a portion of a tape or media, and to immediately read verify the newly written portion of the tape. As such, the SGV module is able to write data to and read verify data from a tape concurrently.

In one embodiment, a same gap verify (SGV) module head assembly comprises a substrate, and a plurality of write transducer and read transducer pairs disposed on the substrate, each write transducer and read transducer pair comprising a write transducer, a read transducer, and a null shield disposed between the write transducer and the read transducer. Each write transducer comprises a write pole, a return pole, a core coil, and a return coil. Each read transducer is disposed in the null region such that the SGV module head assembly is controllable to write first data to a tape using the write transducer of each pair and read verify the first data using the read transducer of each pair.

The null region is a location where flux from the core coil cancels out flux from the return coil. Each read transducer comprises a first shield, a second shield, and a magnetic sensor disposed between the first shield and the second shield. The magnetic sensor is disposed in the null region. Each null shield is disposed between the first shield of the read transducer and the write pole of the write transducer. The null region is based in part on a separation distance between the write transducer and the read transducer of each pair. Each null shield comprises a soft ferromagnetic alloy. One or more of a position between the write transducer and the read transducer of each pair, a width, a height, a thickness, and a permeability of the null shield is selected to create a null region. The null shield has a greater height than the write pole, and the null shield is disposed about a first distance from the write transducer and a second distance from the read transducer, the first distance being about equal to the second distance. The null shield has a height between about 20 μm to about 30 μm, and the null shield is disposed about a first distance from the write transducer and a second distance from the read transducer, the first distance being less than to the second distance. The null shield has a first height about equal to a second height of the write pole, and the null shield has a thickness between about 0.2 μm to about 1 μm and a permeability of about 1000.

The SGV module head assembly is controllable to concurrently write second data to and read third data from the tape using the plurality of write transducer and read transducer pairs. A tape drive comprises the SGV module head assembly and a controller configured to control the SGV module head assembly to write data to the tape using the write transducer of each pair and read verify the data using the read transducer of each pair.

In another embodiment, a tape head comprises a first SGV module head assembly comprising: a plurality of first write transducers disposed in a first row on a first substrate, each first write transducer comprising a write pole, a return pole, a core coil, and a return coil, a plurality of first null shields disposed in a second row adjacent to the first row on the first substrate, wherein one or more of a width, a height, a position, a thickness, and a permeability of each of the plurality of first null shields is varied to create a first null region, and a plurality of first read transducers disposed in a third row adjacent to the second row on the first substrate, each first read transducer comprising a magnetic sensor. Each first read transducer is disposed in the first null region. Each first write transducer of the plurality of first write transducers is paired with an adjacent first read transducer of the plurality of first read transducers and an adjacent first null shield of the plurality of first null shields to form a plurality of first write transducer and first read transducer pairs such that the first SGV module head assembly is controllable to write first data to a tape using the first write transducer of each pair and read verify the first data using the first read transducer of each pair.

The first null region is a location where flux from the core coil cancels out flux from the return coil in each first write transducer. The magnetic sensor of each first read transducer is disposed in the first null region. A separation distance between the first row and the third row is adjusted to determine the first null region.

A second SGV module head assembly comprises a plurality of second write transducers disposed in a fourth row on a second substrate, each second write transducer comprising a write pole, a return pole, a core coil, and a return coil, a plurality of second null shields disposed in a fifth row adjacent to the fourth row on the second substrate, wherein one or more of a width, a height, a position, a thickness, and a permeability of each of the plurality of second null shields is varied to create a second null region, and a plurality of second read transducers disposed in a sixth row adjacent to the fifth row on the second substrate, each second read transducer comprising a magnetic sensor. Each second read transducer is disposed in the second null region. Each second write transducer of the plurality of second write transducers is paired with an adjacent second read transducer of the plurality of second read transducers and an adjacent second null shield of the plurality of second null shields to form a plurality of second write transducer and second read transducer pairs such that the second SGV module head assembly is controllable to write second data to a tape using the second write transducer of each pair and read verify the second data using the second read transducer of each pair.

The second null region is a location where flux from the core coil cancels out flux from the return coil in each second write transducer. The magnetic sensor of each second read transducer is disposed in the second null region. A separation distance between the third row and the sixth row is adjusted to determine the second null region. A tape drive comprises the tape head and a controller configured to: control the first SGV module head assembly to concurrently write third data to and read fourth data from the tape using the plurality of first write transducer and first read transducer pairs, and control the second SGV module head assembly to concurrently write fifth data to and read sixth data from the tape using the plurality of second write transducer and second read transducer pairs. A tape drive comprises the tape head and a controller configured to control the first SGV module head assembly to write data to the tape using the plurality of first write transducers and read verify the data using the plurality of first read transducers.

In yet another embodiment, a SGV module head assembly comprises a substrate and a plurality of write transducer and read transducer pairs disposed on the substrate, each write transducer and read transducer pair comprising a write transducer, a read transducer, and means for creating a null region. Each write transducer comprises a write pole, a return pole, a core coil, and a return coil. The null region is a location where flux from the core coil cancels out flux from the return coil. Each read transducer is disposed in the null region such that the SGV module head assembly is controllable to write first data to a tape using the write transducer of each pair and read verify the first data using the read transducer of each pair.

Each read transducer comprises a first shield, a second shield, and a magnetic sensor disposed between the first shield and the second shield. The magnetic sensor is disposed in the null region. Each means for creating the null region is disposed between the first shield of the read transducer and the write pole of the write transducer. The null region is based in part on a separation distance between the write transducer and the read transducer of each pair. One or more parameters of the means for creating a null region is adjusted to create the null region. A tape drive comprises the SGV module head assembly and a controller configured to control the SGV module head assembly to write data to the tape using the write transducer of each pair and read verify the data using the read transducer of each pair.

While the foregoing is directed to embodiments of the present disclosure, other and further embodiments of the disclosure may be devised without departing from the basic scope thereof, and the scope thereof is determined by the claims that follow.

What is claimed is:

1. A same gap verify (SGV) module head assembly, comprising:
    a substrate; and
    a plurality of write transducer and read transducer pairs disposed on the substrate, each write transducer and read transducer pair comprising a write transducer, a read transducer, and a null shield disposed between each respective write transducer and read transducer,
    wherein:
        each write transducer comprises a write pole, a return pole, a core coil, and a return coil,
        each read transducer comprises a first shield, a second shield, and a magnetic sensor disposed between the first shield and the second shield, and
        each read transducer is disposed in a null region such that the SGV module head assembly is controllable to write first data to a tape using the write transducer of each pair and read verify the first data using the read transducer of each pair.

2. The SGV module head assembly of claim 1, wherein the null region is a location where flux from the core coil cancels out flux from the return coil.

3. The SGV module head assembly of claim 1, wherein the magnetic sensor is disposed in the null region.

4. The SGV module head assembly of claim 3, wherein each null shield is disposed between the first shield of the read transducer and the write pole of the write transducer.

5. The SGV module head assembly of claim 1, wherein the null region is based in part on a separation distance between the write transducer and the read transducer of each pair, and wherein each null shield comprises a soft ferromagnetic alloy.

6. The SGV module head assembly of claim 1, wherein the SGV module head assembly is controllable to concurrently write second data to and read third data from the tape using the plurality of write transducer and read transducer pairs.

7. The SGV module head assembly of claim 1, wherein one or more of a position between the write transducer and the read transducer of each pair, a width, a height, a thickness, and a permeability of the null shield is selected to create a null region.

8. The SGV module head assembly of claim 7, wherein the null shield has a greater height than the write pole, and wherein the null shield is disposed about a first distance from the write transducer and a second distance from the read transducer, the first distance being about equal to the second distance.

9. The SGV module head assembly of claim 7, wherein the null shield has a height between about 20 μm to about 30 μm, and wherein the null shield is disposed about a first distance from the write transducer and a second distance from the read transducer, the first distance being less than the second distance.

10. The SGV module head assembly of claim 7, wherein the null shield has a first height about equal to a second height of the write pole, and wherein the null shield has a thickness between about 0.2 μm to about 1 μm.

11. A tape drive, comprising:
the SGV module head assembly of claim 1; and
a controller configured to control the SGV module head assembly to write data to the tape using the write transducer of each pair and read verify the data using the read transducer of each pair.

12. A tape head, comprising:
a first same gap verify (SGV) module head assembly, comprising:
a plurality of first write transducers disposed in a first row on a first substrate, each first write transducer comprising a write pole, a return pole, a core coil, and a return coil;
a plurality of first null shields disposed in a second row adjacent to the first row on the first substrate, wherein one or more of a width, a height, a position, a thickness, and a permeability of each of the plurality of first null shields is varied to create a first null region; and
a plurality of first read transducers disposed in a third row adjacent to the second row on the first substrate, each first read transducer comprising a first shield, a second shield, and a magnetic sensor disposed between the first shield and the second shield,
wherein:
each first read transducer is disposed in the first null region, and
each first write transducer of the plurality of first write transducers is paired with an adjacent first read transducer of the plurality of first read transducers and an adjacent first null shield of the plurality of first null shields to form a plurality of first write transducer and first read transducer pairs such that the first SGV module head assembly is controllable to write first data to a tape using the first write transducer of each pair and read verify the first data using the first read transducer of each pair.

13. The tape head of claim 12, wherein the first null region is a location where flux from the core coil cancels out flux from the return coil in each first write transducer, and wherein the magnetic sensor of each first read transducer is disposed in the first null region.

14. The tape head of claim 12, wherein a separation distance between the first row and the third row is adjusted to determine the first null region.

15. The tape head of claim 12, further comprising:
a second SGV module head assembly, comprising:
a plurality of second write transducers disposed in a fourth row on a second substrate, each second write transducer comprising a write pole, a return pole, a core coil, and a return coil;
a plurality of second null shields disposed in a fifth row adjacent to the fourth row on the second substrate, wherein one or more of a width, a height, a position, a thickness, and a permeability of each of the plurality of second null shields is varied to create a second null region; and
a plurality of second read transducers disposed in a sixth row adjacent to the fifth row on the second substrate, each second read transducer comprising a first shield, a second shield, and a magnetic sensor disposed between the first shield and the second shield,
wherein:
each second read transducer is disposed in the second null region, and
each second write transducer of the plurality of second write transducers is paired with an adjacent second read transducer of the plurality of second read transducers and an adjacent second null shield of the plurality of second null shields to form a plurality of second write transducer and second read transducer pairs such that the second SGV module head assembly is controllable to write second data to the tape using the second write transducer of each pair and read verify the second data using the second read transducer of each pair.

16. The tape head of claim 15, wherein the second null region is a location where flux from the core coil cancels out flux from the return coil in each second write transducer, and wherein the magnetic sensor of each second read transducer is disposed in the second null region.

17. The tape head of claim 15, wherein a separation distance between the fourth row and the sixth row is adjusted to determine the second null region.

18. A tape drive, comprising:
the tape head of claim 15; and
a controller configured to:
control the first SGV module head assembly to concurrently write third data to and read fourth data from the tape using the plurality of first write transducer and first read transducer pairs; and
control the second SGV module head assembly to concurrently write fifth data to and read sixth data from the tape using the plurality of second write transducer and second read transducer pairs.

19. A tape drive, comprising:
the tape head of claim 12; and
a controller configured to control the first SGV module head assembly to write data to the tape using the plurality of first write transducers and read verify the data using the plurality of first read transducers.

20. A same gap verify (SGV) module head assembly, comprising:

a substrate; and a plurality of write transducer and read transducer pairs disposed on the substrate, each write transducer and read transducer pair comprising a write transducer, a read transducer, and individual means for creating a null region, each write transducer and read transducer pair comprising the individual means for creating the null region, wherein:
- each write transducer comprises a write pole, a return pole, a core coil, and a return coil,
- each read transducer comprises a first shield, a second shield, and a magnetic sensor disposed between the first shield and the second shield,
- the null region is a location where flux from the core coil cancels out flux from the return coil, and
- each read transducer is disposed in the null region such that the SGV module head assembly is controllable to write first data to a tape using the write transducer of each pair and read verify the first data using the read transducer of each pair.

21. The SGV module head assembly of claim 20, wherein the magnetic sensor is disposed in the null region, and wherein each means for creating the null region is disposed between the first shield of the read transducer and the write pole of the write transducer.

22. The SGV module head assembly of claim 20, wherein the null region is based in part on a separation distance between the write transducer and the read transducer of each pair, and wherein one or more parameters of the means for creating the null region is adjusted to create the null region.

23. A tape drive, comprising:
- the SGV module head assembly of claim 20; and
- a controller configured to control the SGV module head assembly to write data to the tape using the write transducer of each pair and read verify the data using the read transducer of each pair.

\* \* \* \* \*